No. 803,256. PATENTED OCT. 31, 1905.
S. E. TUMALTY.
ATTACHMENT FOR TIRE SETTERS.
APPLICATION FILED JUNE 23, 1904.
3 SHEETS—SHEET 1.
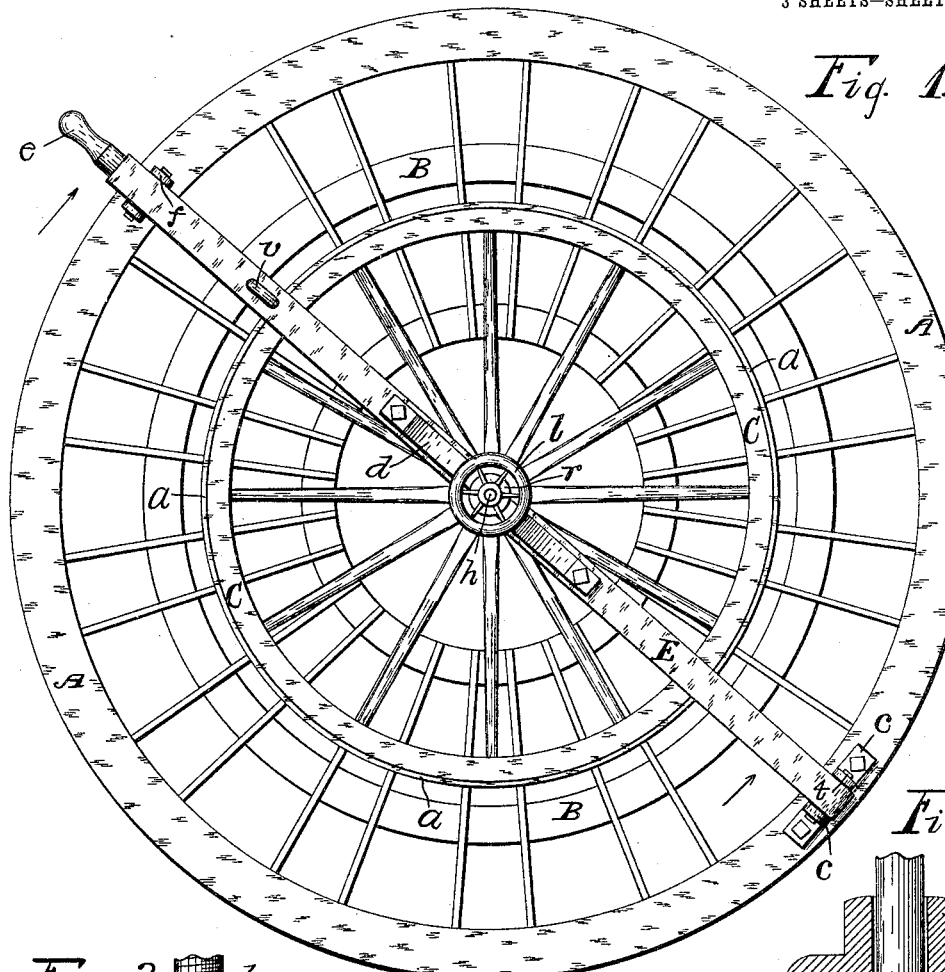
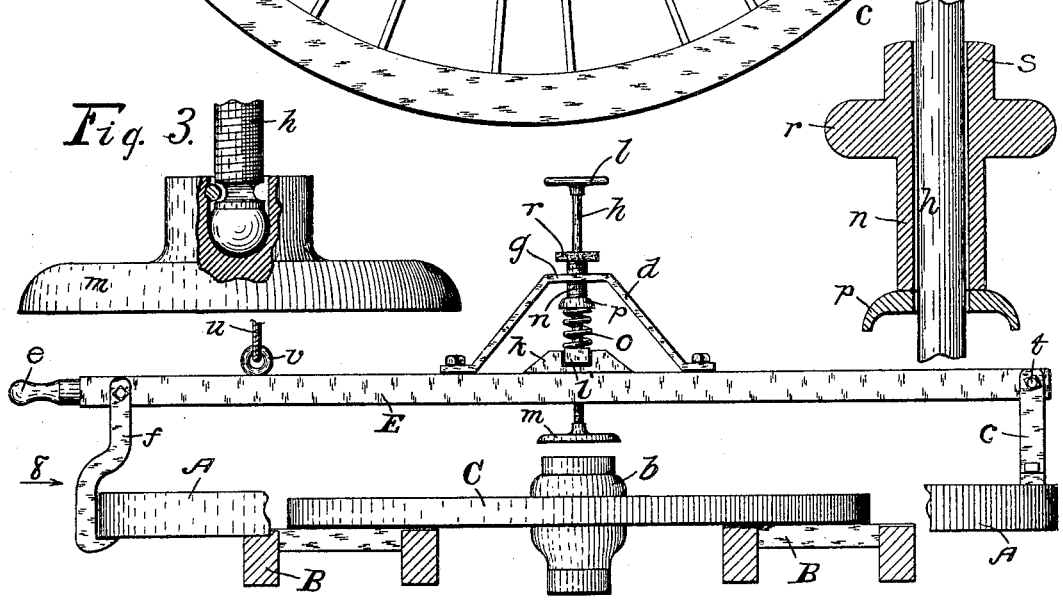

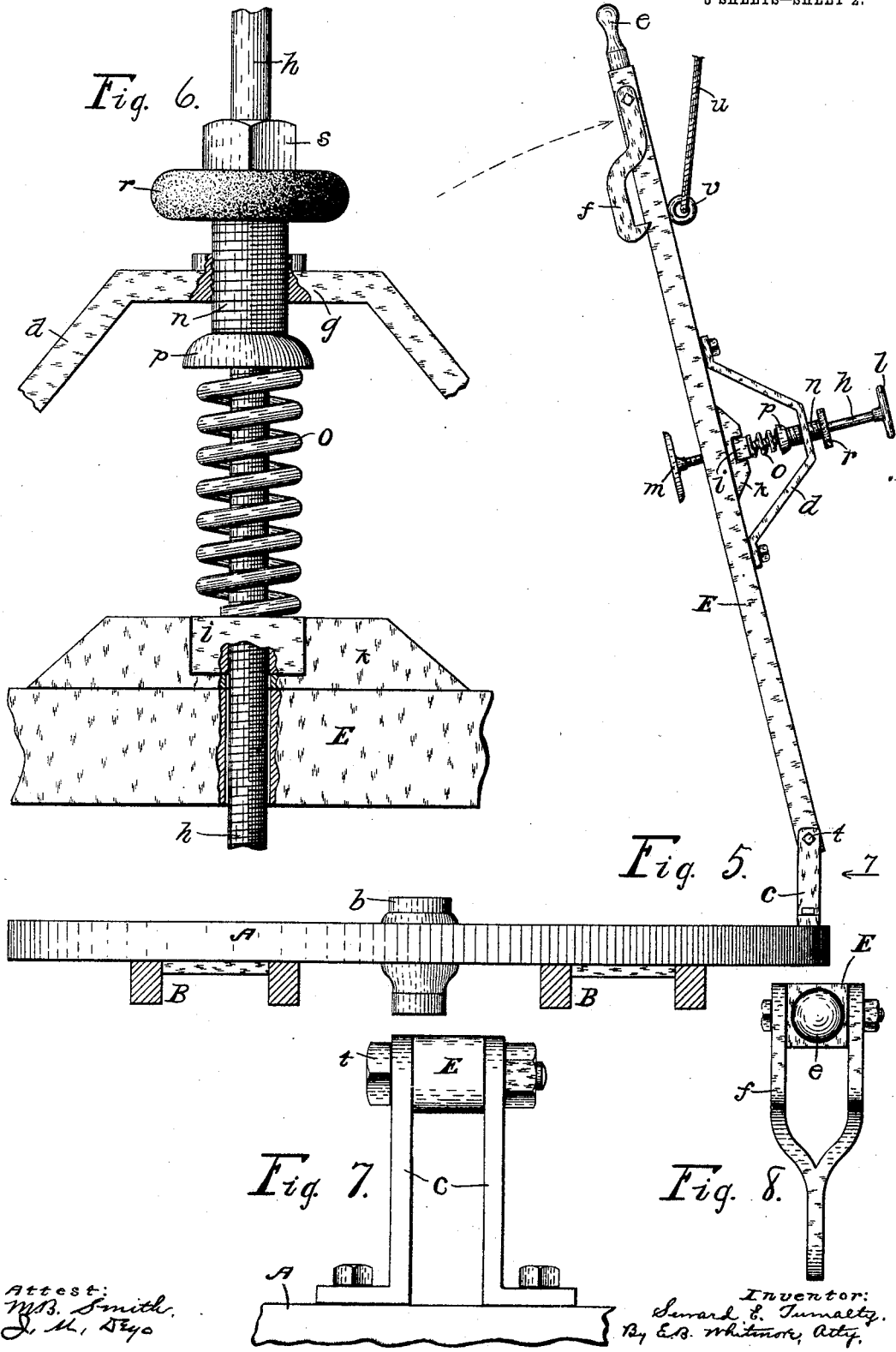

No. 803,256. PATENTED OCT. 31, 1905.
S. E. TUMALTY.
ATTACHMENT FOR TIRE SETTERS.
APPLICATION FILED JUNE 23, 1904.
3 SHEETS—SHEET 3.
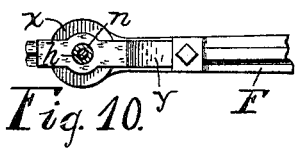
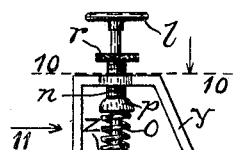
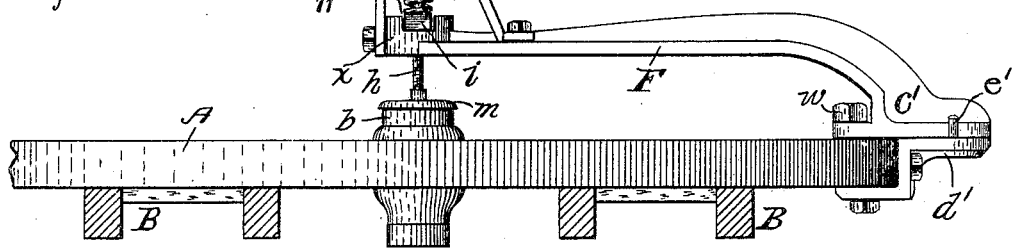
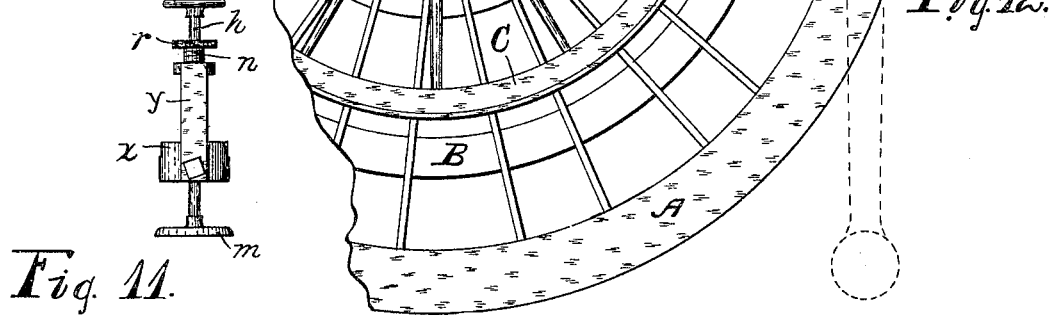
Inventor:
Seward E. Tumalty,
By E. B. Whitmore, Atty.
Attest:
M. B. Smith.
J. M. Deyo.

UNITED STATES PATENT OFFICE.

SEWARD E. TUMALTY, OF PERRY, NEW YORK, ASSIGNOR TO WEST TIRE SETTER COMPANY, OF ROCHESTER, NEW YORK.

ATTACHMENT FOR TIRE-SETTERS.

No. 803,256.  Specification of Letters Patent.  Patented Oct. 31, 1905.

Application filed June 23, 1904. Serial No. 213,876.

*To all whom it may concern:*

Be it known that I, SEWARD E. TUMALTY, of Perry, in the county of Wyoming and State of New York, have invented a new and useful Improvement in Attachments for Tire-Setters, which improvement is fully set forth in the following specification and shown in the accompanying drawings.

In setting tires while cold upon wagon-wheels by external pressure—as, for example, by the means and in the manner shown and set forth in Letters Patent No. 748,292, of date December 29, 1903, and by similar machines for the purpose, shown and set forth in earlier Letters Patent—trouble has been frequently experienced on account of the tendency of the inward pressure against the tire to cause a too sharp or marked dish of the wheel. If the wheel be old and with already a considerable dish from use and from having tires frequently set thereon, it will yield more readily to the radial inward pressure against the tire in the act of setting, and so assume a sharper and more objectionable dish form. On account of this it is frequently found difficult or quite impossible to set the tire onto the wheel firm and in a satisfactory manner. Observing these difficulties in the practical use of these tire-setting machines and the deficiency in their structure relating to this matter, I have endeavored to remedy the same and supply the deficiency by producing the invention herein set forth, the same being means for holding the hub of the wheel downward or more nearly in the plane of the felly during the process of compressing the tire to place on the wheel by the means stated.

In other words, my present invention is to provide convenient means for holding the hub of the wheel in place relative with the plane of the felly and prevent it springing out at one side while the pressure is being applied against the tire. To this end and for this purpose I have provided the means and mechanism shown in the accompanying drawings and set forth in the following specification, reference being had to the said drawings, and to the letters of reference marked thereon, all constituting a part of this specification, the invention being particularly pointed out in the appended claims.

Figure 1 is a plan of a tire-setting machine, showing one form of my improved device in place thereon as in use. Fig. 2 is a side elevation of the parts seen as indicated by arrows in Fig. 1, parts being broken away and the wheel-floor diametrically sectioned. Fig. 3 is a side elevation of the foot-plate and adjacent part of the center rod, parts being broken away and axially sectioned. Fig. 4 is a central longitudinal section of the sleeve and cup, showing a part of the center rod. Fig. 5 is a side elevation of parts, showing the cross-arm tilted. Fig. 6 is a side elevation of parts at the middle of the cross-arm, further showing the construction, some small parts being sectioned on a vertical plane coinciding with the axis of the center rod. Fig. 7 is an elevation of the standards holding the arm, seen as indicated by arrow 7 in Fig. 5. Fig. 8 is a front elevation of the catch-hook, seen as indicated by arrow 8 in Fig. 2. Fig. 9 is a side elevation of the parts, showing the arm short or of half-length. Fig. 10 is a plan of parts at the operative end of the arm, the section being on the dotted line 10 10 in Fig. 9. Fig. 11 is an end elevation of the arm and incumbent parts, seen as indicated by arrow 11 in Fig. 9. Fig. 12 is a plan of the parts shown in Fig. 9, the arm being shown in two positions by full and dotted lines and parts omitted. Figs. 3, 4, 6, 7, and 8 are drawn to scales larger than that of the remaining figures.

Referring to the parts shown in the drawings, A is the steel base-ring common to the inventions set forth in the Letters Patent above referred to, B being the floor of the machine for holding the wagon-wheel C while the tire $a$ is being set thereon. In one form of the device shown E, Figs. 1, 2, and 5, is a stiff bar or cross-arm held at one end upon a bolt $t$ between opposing standards $c$ $c$, secured rigidly to the ring A, said arm extending diametrically across above the ring and over the floor B. The arm E is adapted to swing upon the bolt $t$ in a vertical plane to occupy either a horizontal position over and parallel with the ring A, as shown in Fig. 2, or turned upward to a position of inaction and out of the way, as shown in Fig. 5. At its opposite end the arm is provided with a bifurcated pendant-retaining hook or holder $f$ to engage in under the ring A to hold the arm in horizontal position when in use, the arm terminating in a handle $e$ for the purpose of operating it. The hook $f$ is of such form and so pivotally attached to the arm that it normally hangs in position to engage the under side of the ring, as shown in Fig. 2, it taking this position of action automatically when the arm is brought down to a horizontal position ready for use.

The arm E crosses the axis extended of the ring A, it being provided at the middle with an upwardly-projecting open bracket $d$, Figs. 1 and 2, rigidly secured to its upper surface. This bracket is formed with a straight part $g$, parallel with the supporting-arm, said part being vertically pierced to receive through it a vertical center rod $h$, coaxial with the ring A and the hub $b$ of the wagon-wheel. The rod $h$ is threaded for a distance upward from its lower end and provided with a threaded nut $i$, held against turning with the rod in an angular cavity of a block $k$, rigid with the arm E. At its upper end the center rod $h$ is provided with a hand-wheel $l$ for the purpose of turning it through the nut $i$, and at its lower end the rod has a circular foot-plate $m$ opposite the hub $b$ of the wheel C. As the external pressure is put upon the wheel in the act of setting the tire the tendency of the pressure is to increase the dish of the wheel, causing the hub to rise, which upward motion of the hub is checked and controlled by the opposing foot-plate. By turning the center rod $h$ upward or downward through the nut $i$ or adjusting it vertically to vary the distance between the foot-plate $m$ and the hub $b$ previous to setting the tire the amount of the dish of the wheel may be regulated. The foot-plate is held movably on the end of the center rod $h$, as clearly shown in Fig. 3, so as to have a slight universal rocking motion on the rod, to the end that it may in every case fairly meet and press the end of the hub. This slight universal rocking motion of the plate on the rod is essential, for it is frequently the case that the inner ends of the hubs of wheels are untrue or slanting and not in planes at right angles with the axes of the hubs, and in consequence the foot-plate needs to slightly tilt in order to fairly meet and press the end of the hub.

It is found desirable and important in the matter of holding the hubs of the wagon-wheels against lifting or pushing out at one side while the tires are being pressed to place thereon to hold the hubs with a yielding or elastic force or pressure and not with a positive or unyielding force. To this end the arm E is frequently made of firm elastic material, as hard wood, like oak, hickory, or ash, so as to bend upward with resisting force when hard pressed by the rising hub of the wagon-wheel, the nut $i$ being held immovable on the arm by some simple and ordinary means. I generally prefer, however, in making this form of attachment to make the arm quite rigid, as of hollow or tubular metal, and supply the center rod $h$ with a spring $o$ to resist the upward motion of the hub of the wheel. For using the spring $o$ I employ a sleeve $n$, Figs. 2, 4, and 6, on the center rod $h$, threaded in the horizontal part $g$ of the bracket $d$, and an inverted cup $p$ over the spring independent of both the sleeve and the rod $h$, the spring being between the cup and the nut $i$, as shown. At its upper end the sleeve is formed with a knurled ring $r$, constituting a handle for turning it, and by turning the sleeve upward or downward through the bracket the tension of the spring may be regulated and so the resistance of the foot-plate $m$ to the upwardly-moving hub controlled. In constructing this sleeve $n$ I usually form it with a prismatic head $s$, Fig. 6, for the purpose of using a wrench, when necessary, for turning it.

To control the arm E in its vertical swinging movements, a weighted cord or cable $u$ is employed, secured in an eye $v$, rigid with the arm and passing over a pulley (not shown) overhead, which serves to hold the arm and parts normally up out of the way when putting the wagon-wheels into the machine and removing them therefrom after the tires are set.

Old wagon-wheels or those having been long used and other wheels are frequently sufficiently dished, in which cases the foot-plate $m$ is primarily brought firmly down against the hub, as shown in Fig. 9, before the external pressure is applied against the tire, which prevents a further dishing of the wheel. In case the wheel has no dish or only a slight dish, as is frequently the case, more commonly with new wheels, the foot-plate is brought to a position slightly above the hub, as appears in Fig. 2, before the pressure is applied to the tire. This plate, previously set or adjusted with reference to the hub, acts to receive the rising hub and hold it against further rise, except as the stiff spring $o$ slightly yields upward.

In employing the half-length or radial overhanging arm F, Figs. 9 to 12, in place of the diametral arm E to hold the center rod $h$ and associated mechanism said short arm is made to rest upon the ring A, being held thereto by a single pivotal bolt $w$, rigid in the ring. This half-length arm F is formed with an enlarged outwardly-extended foot $c'$, resting, in part, directly upon the ring A, but mainly upon an extended horizontal bracket or shelf $d'$, secured to the ring with its upper surface even with the corresponding surface of the ring. The arm F is formed with a circular head $x$ at its extreme overhanging end, the construction of the whole being such that the head $x$ is horizontal and coaxial with the hub of the wheel. An open bracket $y$, substantially like the bracket $d$ above described, is mounted upon the arm over the head $x$, as shown. The head $x$ of the arm is formed with a cross slot or recess $z$ for receiving and holding the nut $i$ of the center rod, the sleeve $n$ being threaded through the upper horizontal part of the bracket, as in case of the bracket $d$ already described. The bracket $y$ is permanently secured to the arm F; but the other parts associated with the bracket—that is to say, the center rod $h$, with its foot-plate and hand-wheel, and the sleeve $n$, the cup $p$, and the spring $o$, are the same used with the arm E, as described, all being transferable as to the two different arms, fitting both alike. When putting a wheel into the machine for setting the tire, the arm F is turned horizontally to one side out of the way, as indicated by dotted lines in Fig. 12, this motion of the arm being made on the pivot-bolt $w$. A stop-pin $e'$, rigid in the shelf $d'$, in position to meet the foot $c'$ of the arm, serves to arrest the swinging motion of the arm and hold the head $x$ centrally over the hub of the wheel.

What I claim as my invention, and desire to secure by Letters Patent, is—

1. An attachment for a tire-setting machine, comprising a center rod coaxial with the hub of the wheel receiving the tire, a support for said rod, a part on the center rod to meet the hub of the wheel, a universal-joint connection between said part and rod, a spring around said rod and means coöperating with said spring to resist the upward motion of the hub and means adapted to extend over the wheel and in which said center rod is mounted.

2. An attachment for a tire-setter consisting of an arm over the floor of the machine, a slidable center rod held coaxially with the hub, a spring around said rod and having a bearing on said arm, a plate on the center rod having a universal-joint connection with said rod, and means coöperating with said spring to resist the movement of the hub.

3. An attachment for machines for setting tires consisting of a base-ring, an arm over the base-ring and crossing the extended axis thereof, a slidable center rod on the arm held coaxial with the hub and with the base-ring to conform to the hub of the wheel, means for permitting the movement of the arm out of action, a plate on the center rod having a universal-joint connection with said rod, a spring around said rod and means coöperating with the spring to resist the upward movement of the hub.

4. An attachment for a tire-setting machine, having an arm over the base-ring, a bracket on the arm, a center rod guided by the bracket, a nut threaded on the center rod and supported by the arm, and means on the bracket and spring means on the center rod to resist upward motions of the hub of the wheel.

5. An attachment for machines for setting wagon-tires, consisting of a movable arm over the base-ring, a bracket on the arm, a center rod in the bracket, a threaded nut on the center rod and held against turning thereon, a sleeve threaded in the bracket, and receiving said center rod, said rod being movable in the sleeve and said nut being movable with the rod, and a spring interposed between said nut and the sleeve, and means on the center rod to meet the hub of the wheel.

6. In an attachment for a tire-setting machine, a horizontal arm over the machine, a vertical center rod held by the arm coaxial with the wheel and independent of the hub thereof, a foot-plate on the center rod to press against the end of the hub of the wheel, and means for longitudinally adjusting the center rod and means around said rod for holding said foot-plate with yielding pressure against the hub of the wheel.

In witness whereof I have hereunto set my hand this 20th day of June, 1904, in the presence of two subscribing witnesses.

SEWARD E. TUMALTY.

Witnesses:
F. M. PRESNALL,
NORA CONGDON.